(12) United States Patent
Cademartiri et al.

(10) Patent No.: US 6,203,830 B1
(45) Date of Patent: Mar. 20, 2001

(54) METHOD OF PRODUCING FILLED PASTA

(75) Inventors: Enrico Cademartiri, Cremona; Antonio Chierici, Parma; Francesco Panto', Parma; Rosamaria Petrosino, Parma; Enrico Schiaretti, Parma, all of (IT)

(73) Assignee: Barilla Alimentare S.p.A., Parma (IT)

( * ) Notice: Subject to any disclaimer, the term of this patent is extended or adjusted under 35 U.S.C. 154(b) by 0 days.

(21) Appl. No.: 09/338,195

(22) Filed: Jun. 22, 1999

(30) Foreign Application Priority Data

Jun. 23, 1998 (EP) ..................................... 98830379

(51) Int. Cl.[7] .............................. A21D 13/00; A23G 3/00; A23P 1/08
(52) U.S. Cl. ................... 426/94; 426/275; 426/283; 426/451; 426/557
(58) Field of Search ..................... 426/94, 275, 283, 426/451, 557

(56) References Cited

U.S. PATENT DOCUMENTS

| 4,517,203 | * | 5/1985 | Levine et al. | 426/19 |
| 5,263,407 | * | 11/1993 | Pomara, Jr. | 99/450.6 |
| 5,693,351 | * | 12/1997 | Cuperus | 426/94 |
| 5,814,360 | * | 9/1998 | McDilda et al. | 426/94 |
| 5,968,570 | * | 10/1999 | Paulucci | 426/94 |
| 6,030,651 | * | 2/2000 | Bronner | 426/91 |

* cited by examiner

*Primary Examiner*—Nina Bhat
(74) *Attorney, Agent, or Firm*—Darby & Darby

(57) ABSTRACT

A method of producing filled fresh or dried pasta comprising a filling enclosed in at least one piece of rolled pasta dough having a moisture content of from 25% to 40% and comprising a peripheral portion and a substantially central portion for receiving a filling in which at least one notch is formed in the peripheral portion of at least one piece, the notch affecting the central portion receiving the filling; the filled pasta which can be produced by the method has better characteristics of consistency and palatability than the corresponding conventional filled pasta, upon cooking.

20 Claims, 3 Drawing Sheets

METHOD OF PRODUCING FILLED PASTA

FIELD OF THE INVENTION

The present invention relates to a method of producing filled pasta.

BACKGROUND OF THE INVENTION

Various kinds of filled pasta, for example, tortellini, ravioli, agnolotti, etc., constituted by one or more pieces of rolled pasta dough enclosing a filling, are known in the food field.

In pasta of these types, the individual pieces of rolled dough are prepared from a main sheet made of conventional dough comprising semolina and eggs, whereas the filling is prepared in accordance with a recipe comprising various ingredients such as meat, ham, cheese, spices, etc., suitably selected and mixed according to the flavour to be conferred on the filled pasta.

It is also known that the preparation of the aforementioned filled pasta requires a series of steps having the purpose of enclosing the filling between one or more pieces of pasta and forming the desired type of pasta.

For example, during the preparation of tortellini, the filling is metered onto a piece of pasta dough which is folded so as to house the filling in a kind of pouch.

The edges of the folded piece are then sealed and the opposite ends of the folded piece are superimposed and pressed together to form the tortellino.

Once the filled pasta has been formed it can undergo a stabilizing step to produce a fresh product, and possibly a subsequent drying step to produce a dried product.

A recognized disadvantage of commercial filled pasta, particularly dried filled pasta, is poor hydration of the filling during cooking in water, which in turn leads to the production of a cooked pasta the consistency and palatability of which do not satisfy the consumer's expectations.

In fact, in cooked filled pasta, the poorly hydrated filling feels substantially hard and "dry" on the consumer's palate and the consumer also notices a different consistency between the filling and the pasta which, on the other hand, is soft after cooking.

To prevent the aforementioned problem, some technical means have been proposed and sometimes adopted in the past for creating one or more passageways for the cooking water into the pasta envelope housing the filling.

U.S. Pat. No. 2,950,978 describes a method of preparing dried ravioli in which holes are formed in the central portion of the pasta envelope formed by two superimposed pieces housing the filling, so as to promote the escape of moisture from inside the ravioli during drying and to improve the rehydration of the filling during cooking.

This method has various disadvantages, amongst which is the need to provide an additional step in the production cycle for forming the holes in the pasta envelope which, amongst other things, is not easy to perform on an industrial scale.

Patent EP 0 439 806 describes a method of preparing filled dried pasta such as ravioli and tortellini, in which at least one passageway is created between the superimposed and sealed edges of the pasta envelope, putting the filling into communication with the environment outside the pasta.

According to one embodiment described in this patent, this is effected by first of all inserting a needle between the superimposed edges of the pasta envelope, then sealing the edges by pinching and, finally, withdrawing the needle, thus producing a passageway between the superimposed edges.

Alternatively, according to a second embodiment described in the above-mentioned patent, the superimposed edges of the pasta envelope are sealed by means of special pinching moulds which have interruptions in one or more sections of their pressure surfaces so that these sections of the superimposed edges of the pasta envelope are not sealed.

However, the first embodiment mentioned above has the disadvantage that it is necessary to provide two additional steps in the production cycle (the insertion and withdrawal of the needle) which render this method uneconomic and difficult to implement.

Moreover, for the additional steps, it requires the availability of fairly complex apparatus which may be complicated and difficult to operate automatically in synchronism with the pinching.

Finally, the filled pasta produced by the above-mentioned method has the disadvantage that the passageways created therein tend to collapse during cooking, in fact blocking the path of the water towards the filling.

The second above-mentioned method described in EP 0 439 806, on the other hand, has the disadvantage that no passageway is in fact created between the superimposed edges of the pasta envelope since, even in the sections of the piece of pasta which are not sealed, these edges are nevertheless in contact so that the filling is not rehydrated during cooking or is rehydrated to a very limited extent.

SUMMARY OF THE INVENTION

The problem upon which the present invention is based is that of providing filled pasta having characteristics such as to overcome all of the problems complained of above with reference to the prior art during cooking, that is, filled pasta which, when cooked, has a filling which feels sufficiently soft and "moist" to the consumer's palate, and which has a consistency comparable to that of the piece of pasta, at the same time maintaining good organoleptic and structural characteristics.

This problem is solved by filled pasta which can be produced by a production method comprising the steps of:
  a) providing a plurality of pieces of rolled pasta dough, each piece comprising a peripheral portion and a substantially central portion for receiving a filling,
  b) providing a pasta filling,
  c) metering the filling onto the central portions of the pieces,
  d) folding each piece along a substantially central line so as to enclose the filling in a kind of pouch,
  e) sealing the edges of the folded pieces in the region of the peripheral portions of the pieces,
in which before step c) at least one notch is formed in the peripheral portion of each piece, the notch affecting the central portion receiving the filling.

According to one embodiment of the invention, the pieces of rolled pasta dough are substantially circular or elliptical and the method further comprises a step of superimposing and sealing the opposed ends of the folded piece, after step e), so as to produce a tortellino or similar filled pasta.

According to another embodiment, the method of the invention can be used for the production of filled pasta comprising a filling enclosed between two superimposed pieces of rolled pasta dough, in which case, the method comprises the steps of:
  a) providing a first and a second piece of rolled pasta dough, substantially identical to one another and each comprising a peripheral portion and a substantially central portion, b) providing a pasta filling, c) metering the filling onto the central portion of the first piece, d) superimposing the second piece on the first piece so that the peripheral portions fit together, e) sealing the edges of the first and second pieces in the region of the peripheral portions of the pieces, in which before step c) at least one notch is formed in the peripheral portion of at least one of the first and second pieces, the notch extending so far as to affect the central portion.

The said at least one notch is preferably formed in one of the first and second pieces.

The filled pasta which can be produced by the method of the invention may be, by way of non-limiting example, tortellini, ravioli, agnolotti, etc. It may be produced fresh or dried and, in the latter case, is produced by a drying step performed on the fresh pasta to complete the method of the invention.

In any case, it has surprisingly been found that, after cooking, both the fresh filled pasta and the dried pasta produced by the method of the invention have consistency and palatability which fully satisfy the consumer's expectations.

In fact, after cooking, they have a filling which feels sufficiently soft and "moist" to the consumer's palate, with a consistency comparable to that of the pasta.

The pasta pieces usable in the method of the invention are normal pieces of rolled pasta dough produced from conventional doughs by usual extrusion or rolling techniques and have a moisture content of 25–40%.

Generally, a main rolled sheet is produced from such a dough and the individual pieces are cut therefrom.

In the method according to the invention, at least one notch is formed in the peripheral region of at least one piece used to prepare the filled pasta and, as will become clear from the following description, this surprisingly allows the cooking water to pass into the interior of the piece or pieces of filled pasta to an extent such as to hydrate the filling adequately.

The at least one notch may have any profile and, preferably, has a curved profile.

The notches may advantageously be formed in the pieces of pasta during their cutting from the sheet of rolled dough with the use of suitable cutting matrices which can give the notch the desired profile.

In the method according to the invention, the edges of the folded piece or of the superimposed pieces are sealed by pinching with conventional apparatus with the application of a uniform pressure over the entire peripheral portion of the piece.

Fresh or dried filled pasta of any shape and with any filling:pasta ratio by weight may be produced by the method according to the invention.

The dried filled pasta produced according to the method of the invention by the drying of the corresponding fresh pasta has a moisture content of 5–25%, preferably 8–15%.

In the method according to the invention, the filling:pasta ratio by weight preferably varies from 0.3:1 to 1:1.

DETAILED DESCRIPTION OF THE INVENTION

The characteristics and advantages of the invention will become clearer from the following description of an example of the implementation of the method according to the invention, relating to the preparation of fresh and dried tortellini, the description being given by way of non-limiting example with reference to the drawings, in which:

Figure 1:
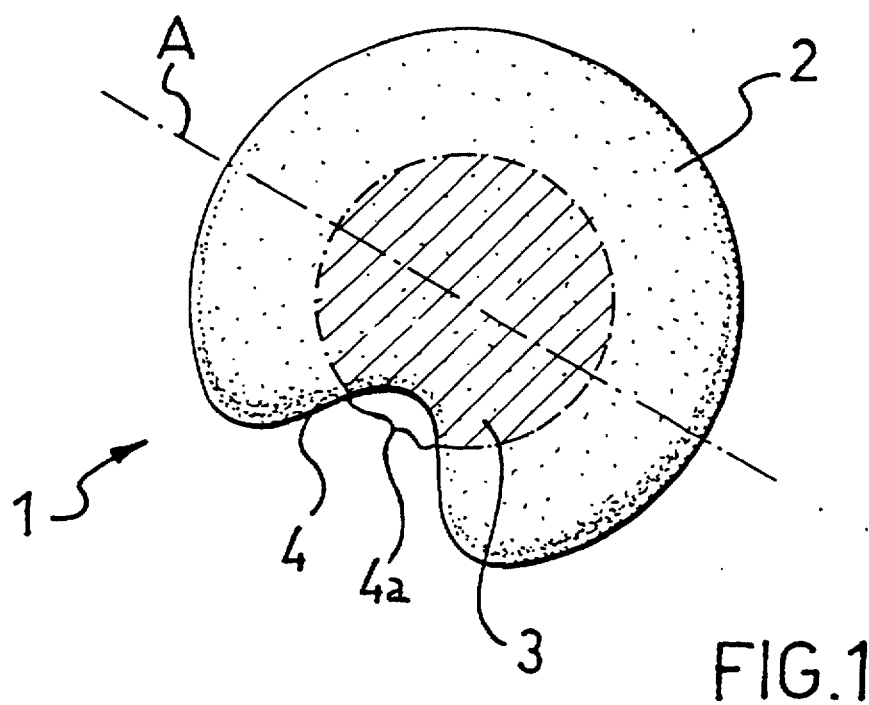
FIG. 1 shows a piece of rolled pasta dough usable for the preparation of a tortellino according to the method of the invention.
Figure 2:
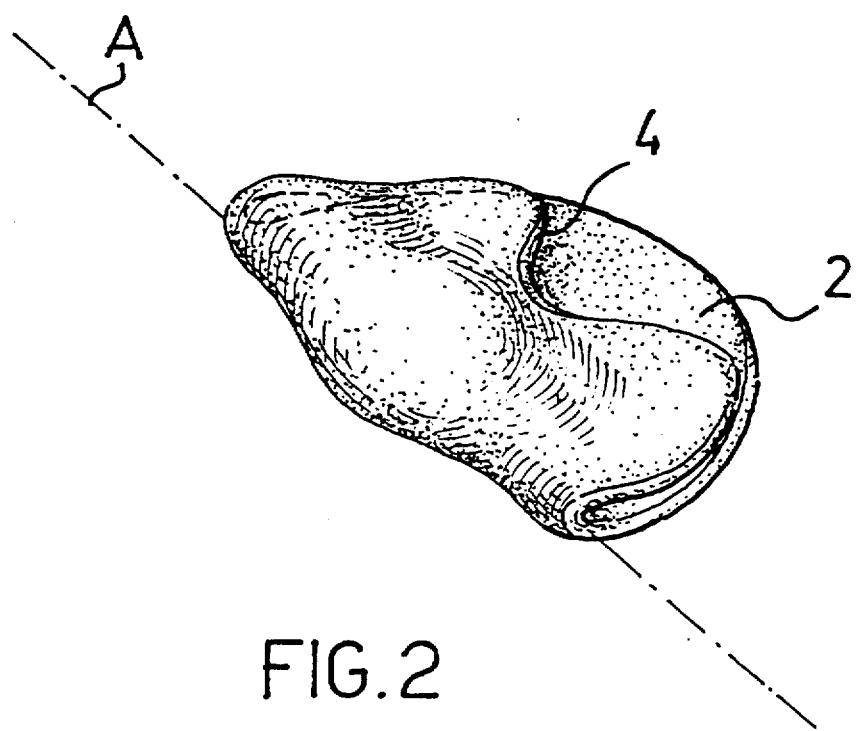
FIG. 2 shows, in perspective, the piece of FIG. 1, folded in accordance with the method of the invention.

A plurality of pieces of rolled pasta dough having a moisture content of about 30% were cut by suitable cutting matrices from a main sheet of rolled pasta dough produced by rolling from a conventional dough containing semolina, eggs and water in predetermined quantities.

All of the pieces, generally indicated 1, were substantially circular, a central portion 3 for receiving a filling and a peripheral portion 2 surrounding and defining the central portion 3 being identified in each piece.

A curved notch 4 was formed in the peripheral portion 2 and extended so far as to affect the central portion 3, into which a portion 4a of predetermined width and depth of the notch 4 extended.

The notch 4 was advantageously formed during the step of the cutting of the individual pasta pieces from a main sheet.

A pasta filling, the ingredients of which are given in Table 1 below, together with the respective percentages by weight, was also prepared:

TABLE 1

| Ingredients | % by weight |
| --- | --- |
| stewed pork and beef | 52.00 |
| raw ham | 6.00 |
| bread crumbs | 15.00 |
| potato flakes | 10.00 |
| vegetable fat | 10.00 |
| Reggiano Parmesan cheese | 6.00 |
| salt | 0.79 |
| spices | 0.30 |
| total | 100.00 |

A predetermined quantity of the filling was then metered onto the central portion 3 of each piece with a filling:pasta ratio of 0.6:1 by weight.

Each piece 1 was then folded along a central line A so as to house the filling in a kind of pouch formed by the central portion 3 of the piece.

As a result of the folding, the peripheral portions 2 of the pieces formed two superimposed edges which were sealed, forming a kind of half-moon, the opposite ends of which were superimposed and sealed thus producing ready-to-eat fresh tortellini weighing approximately 3 grams.

The tortellini thus produced (FIGS. 3 and 4) were characterized by the presence, in the central portion 3 of the piece of pasta, of a hole 5 positioned on the boundary with the peripheral portion 2.

Figure 3:
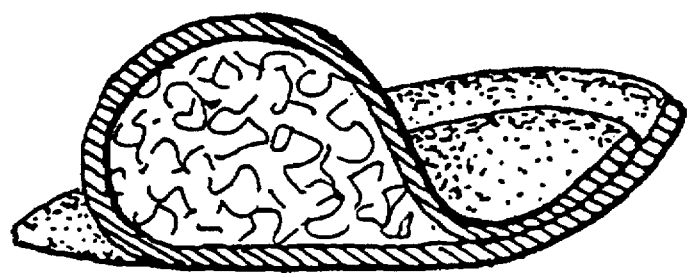
FIG. 3 shows a cross-section of a tortellino produced by the method of the invention, compared with a corresponding cross-section of a conventionally-formed tortellino.
Figure 3:
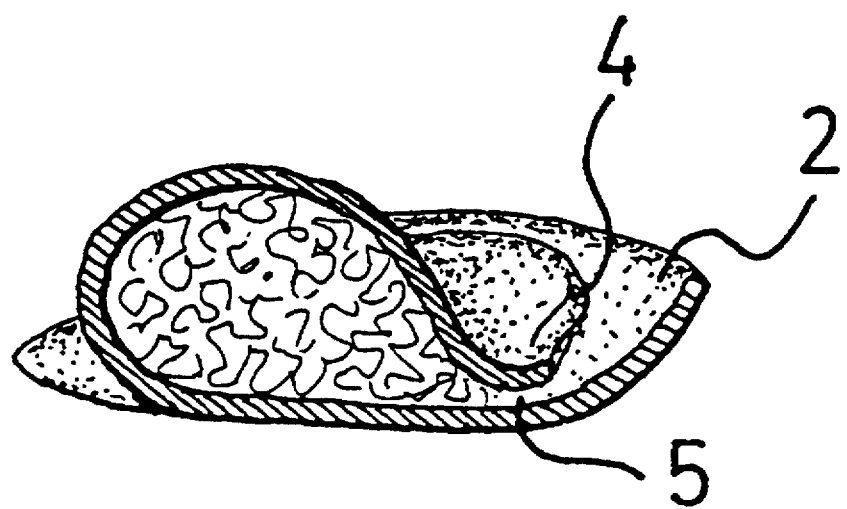
Figure 4:
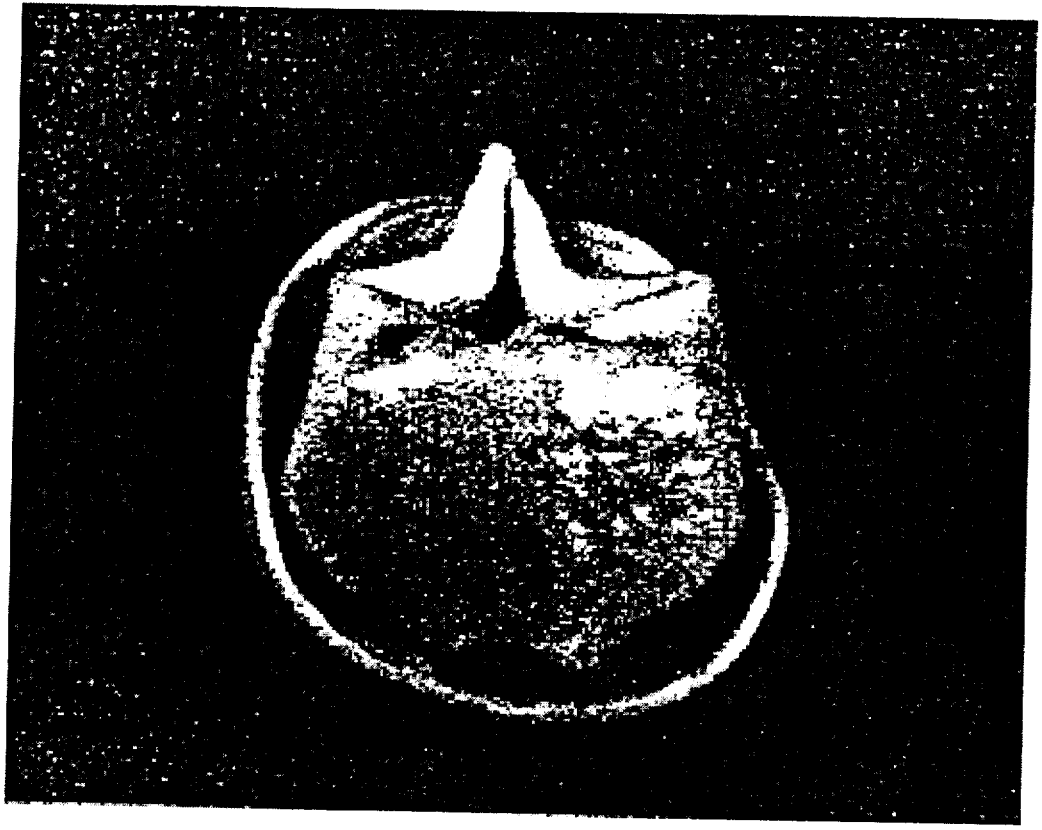
FIG. 4 is a photographic reproduction of a tortellino produced according to the method of the invention.

The hole was in fact defined by the portion 4a of the notch 4 and advantageously put the filling into direct communication with the exterior whereas, in conventionally-formed tortellini, as can be seen from the cross-section of FIG. 3, the filling is completely sealed between the folded portions of the piece of pasta.

Half of the aforesaid fresh tortellini were dried by heat treatment in an atmosphere having 60% relative humidity and a temperature of between 60° C. and 80° C.

The drying treatment continued for about 240 minutes and, upon completion, the dried tortellini had a moisture content of 8–12% and an overall weight of about 2 grams.

During cooking, the behaviour of the fresh and dried tortellini according to the invention was more than satisfactory with regard to consistency and palatability.

In fact, when cooked, the tortellini had a filling which felt soft and "moist" to the consumer's palate, with a consistency comparable to that of the pasta.

Moreover, the tortellini had optimal organoleptic and structural characteristics wholly comparable with those of corresponding good-quality conventional cooked tortellini.

This optimal behaviour upon cooking appears to be due to the fact that the hole 5 in the central portion 3 of the piece of pasta allows the cooking water to pass into the pouch in quantities such as to hydrate the filling adequately, at the same time preventing excessive swelling of the pasta which would cause the structure of the tortellino to disintegrate and the filling to come out of the pouch.

The characteristics, after cooking, in terms of flavour, softness and hydration of the filling of 100 g samples of fresh and dried tortellini produced in accordance with the method of the invention described above were compared with the characteristics of corresponding samples of fresh and dried conventional tortellini after cooking.

The 100 gram samples of tortellini compared were as follows:

conventionally formed fresh tortellini,
fresh tortellini formed in accordance with the invention,
conventionally formed dried tortellini,
conventional dried tortellini with known means in the piece of pasta for hydrating the filling (parallel straight ribs+interruptions in the sealing in sections of the edges of the piece),
dried tortellini formed in accordance with the invention.

The fresh conventional tortellini were produced from the same main sheet of rolled pasta dough which was used to prepare the fresh tortellini according to the invention and had the same weight (about 3 g), shape and moisture content (30%).

The conventional dried tortellini were produced from the corresponding conventional fresh tortellini by the drying method mentioned above for the preparation of dried tortellini in accordance with the invention, so as to have the same weight (about 2 g), shape and moisture content (12%).

All of the tortellini of the samples compared were filled with the same quantity of the filling of Table 1 with a filling:pasta ratio of 0.6:1 and were cooked in an excess of boiling water containing 1% of dissolved cooking salt.

The fresh tortellini were cooked for a period of 6 minutes and the dried tortellini for 9 minutes.

After cooking, the tortellini of each sample were drained and weighed and the percentage of moisture was measured.

The results are given in Table 2 below.

TABLE 2

| Sample | raw weight (g) | raw moisture content (%) | cooked weight (g) | cooked moisture content (%) |
|---|---|---|---|---|
| fresh tortellini formed conventionally | 100 | 30 | 140 | 50.0 |
| fresh tortellini formed according to the invention | 100 | 30 | 166 | 57.8 |
| dried tortellini formed conventionally | 100 | 12 | 161 | 45.3 |
| dried tortellini with known means in the piece of pasta | 100 | 12 | 180 | 51.1 |
| dried tortellini formed according to the invention | 100 | 12 | 208 | 57.7 |

It can be seen from the weight and moisture-content values after cooking given in the above table, that both the fresh and the dried tortellini formed in accordance with the invention could absorb a greater quantity of water during cooking than the corresponding conventional fresh and dried tortellini of the samples compared.

The sensory attributes of the tortellini compared, in terms of softness and flavour, were evaluated by a sample of 100 testers and the results obtained are given in Table 3 below, together with the evaluation criteria adopted.

TABLE 3

| Sample | Softness | Flavour | Overall opinion |
|---|---|---|---|
| Fresh tortellini formed conventionally | 3.3 | 3.2 | 3.2 |
| fresh tortellini formed according to the invention | 3.7 | 3.2 | 3.5 |
| dried tortellini formed conventionally | 2.7 | 2.9 | 2.8 |
| dried tortellini with known means in the piece of pasta | 3.1 | 3.1 | 3.1 |
| dried tortellini formed according to the invention | 3.5 | 3.2 | 3.3 |

Softness
1=hard; 2=slightly soft; 3=quite soft; 4=very soft; 5=extremely soft.

Flavour

1=poor; 2=mediocre; 3=good; 4=very good; 5=excellent.

Overall Opinion

1=poor; 2=mediocre; 3=good; 4=very good; 5=excellent.

It can be seen from Table 3 that both the fresh and the dried tortellini formed in accordance with the invention were considerably softer than the corresponding fresh and dried tortellini formed conventionally and, in the case of the dried tortellini, also softer than the dried tortellini with known means in the piece of pasta for hydrating the filling; this also had a positive effect on flavour perception and resulted in a better overall evaluation of the tortellini according to the invention.

We claim:

1. A method of producing filled pasta, comprising the steps of:
   a) providing a plurality of pieces of rolled pasta dough, each piece comprising a peripheral portion and a substantially central portion for receiving a filling,
   b) providing a pasta filling,
   c) metering the filling onto the central portions of the pieces,
   d) folding each piece along a substantially central line so as to enclose the filling in a kind of pouch,
   e) sealing the edges of the folded pieces in the region of the peripheral portions of the pieces,
   in which before step c), at least one notch is formed in the peripheral portion of each piece, the notch affecting the central portion receiving the filling.

2. A method according to claim 1, in which the pieces are substantially circular or elliptical and the method further comprises a step of superimposing and sealing the opposite ends of the folded pieces after step e).

3. A method of producing filled pasta, comprising the steps of:
   a) providing a first and a second piece of rolled pasta dough substantially identical to one another and each comprising a peripheral portion and a substantially central portion,
   b) providing a pasta filling,
   c) metering the filling onto the central portion of the first piece,
   d) superimposing the second piece on the first piece so that the peripheral portions fit together,
   e) sealing the edges of the first and second pieces in the region of the peripheral portions of the pieces,
   in which before step c), at least one notch is formed in the peripheral portion of at least one of the first and second pieces, the notch extending so far as to affect the central portion.

4. A method according to claim 3, in which the at least one notch is formed in one of the first and second pieces.

5. A method according to claim 1, in which the pieces have a moisture content of 25–40%.

6. A method according to claim 3, in which the first and second pieces have a moisture content of 25–40%.

7. A method according to claim 1, in which the pieces are produced by cutting from a main sheet of rolled pasta dough.

8. A method according to claim 3, in which the first and second pieces are produced by cutting from a main sheet of rolled pasta dough.

9. A method according to claim 7, in which the at least one notch is formed in the piece during the step of cutting from the main sheet.

10. A method according to claim 8, in which the at least one notch is form ed in a t least one of the first and second pieces during the step of cutting from the main sheet.

11. A method according to claim 1 in which the at least one notch has a curved profile.

12. A method according to claim 3 in which the at least one notch has a curved profile.

13. A method according to claim 1, in which the sealing of the edges of the folded pieces is performed by pinching with the application of a uniform pressure to the entire peripheral portions of the pieces.

14. A method according to claim 3, in which the sealing of the edges of the first and second pieces is performed by pinching with the application of a uniform pressure to the entire peripheral portions of the pieces.

15. A method according to claim 1, in which the filled pasta is dried to give a moisture content of 5–25%.

16. A method according to claim 3, in which the filled pasta is dried to give a moisture content of 5–25%.

17. A method according to claim 15, in which the filled pasta is dried to give a moisture content of 8–15%.

18. A method according to claim 16, in which the filled pasta is dried to give a moisture content of 8–15%.

19. Filled pasta which can be produced by the method according to claim 1.

20. Filled pasta which can be produced by the method according to claim 3.

* * * * *